(12) United States Patent
Baba

(10) Patent No.: US 11,907,055 B2
(45) Date of Patent: Feb. 20, 2024

(54) CONTROLLER, DIAGNOSIS METHOD, AND DIAGNOSIS PROGRAM

(71) Applicant: FANUC CORPORATION, Yamanashi (JP)

(72) Inventor: Eiji Baba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 304 days.

(21) Appl. No.: 16/910,402

(22) Filed: Jun. 24, 2020

(65) Prior Publication Data

US 2021/0011792 A1 Jan. 14, 2021

(30) Foreign Application Priority Data

Jul. 10, 2019 (JP) .................. 2019-128347

(51) Int. Cl.

| G06F 11/07 | (2006.01) |
|---|---|
| G05B 19/4155 | (2006.01) |
| G06Q 50/04 | (2012.01) |
| G05B 19/418 | (2006.01) |
| G05B 19/042 | (2006.01) |
| G05B 19/406 | (2006.01) |
| H04L 61/103 | (2022.01) |
| H04L 69/16 | (2022.01) |

(52) U.S. Cl.
CPC ........ G06F 11/079 (2013.01); G05B 19/4155 (2013.01); G06F 11/0736 (2013.01); G06F 11/0757 (2013.01); H04L 69/16 (2013.01); G05B 2219/31449 (2013.01); G05B 2219/33236 (2013.01); G06Q 50/04 (2013.01)

(58) Field of Classification Search
CPC .............. G06F 11/079; G06F 11/0736; G06F 11/0757; H04L 69/16; G05B 2219/31449; G05B 2219/33236; G06Q 50/04
See application file for complete search history.

(56) References Cited

U.S. PATENT DOCUMENTS

| 5,839,534 | A | * | 11/1998 | Chakraborty | ...... B60K 31/0008 |
|---|---|---|---|---|---|
| | | | | | 180/170 |
| 5,898,828 | A | * | 4/1999 | Pignolet | ............... G06F 1/3215 |
| | | | | | 714/10 |
| 6,108,300 | A | * | 8/2000 | Coile | ...................... H04L 69/40 |
| | | | | | 714/4.12 |

(Continued)

FOREIGN PATENT DOCUMENTS

| CN | 106681945 | 5/2017 |
|---|---|---|
| JP | 2002-324014 | 11/2002 |

(Continued)

*Primary Examiner* — Jenee Holland
(74) *Attorney, Agent, or Firm* — Wenderoth, Lind & Ponack, L.L.P.

(57) ABSTRACT

It is desired to be able to easily identify a cause of a communication abnormality in an industrial machine. A controller of an industrial machine which communicates with an external device through a network includes: a plurality of communication units which respectively correspond to a plurality of communication protocols; and a diagnosis unit which starts up the communication units in a predetermined order and attempts communication using the communication protocols corresponding to each communication unit that is started up so as to diagnose the conditions of communication step by step.

8 Claims, 6 Drawing Sheets

(56) References Cited

U.S. PATENT DOCUMENTS

| | | | | |
|---|---|---|---|---|
| 6,173,422 B1* | 1/2001 | Kimura | H04H 60/95 | 348/E17.001 |
| 6,504,851 B1* | 1/2003 | Abler | H04L 29/06 | 370/257 |
| 6,535,855 B1* | 3/2003 | Cahill | G06Q 20/00 | 705/346 |
| 6,615,383 B1* | 9/2003 | Talluri | H04L 67/06 | 714/749 |
| 6,622,013 B1* | 9/2003 | Miyoshi | H04B 7/086 | 455/562.1 |
| 7,111,204 B1* | 9/2006 | Couturier | G06F 11/3495 | 714/39 |
| 7,206,970 B1* | 4/2007 | Lauterbach | G06F 11/2289 | 714/36 |
| 7,363,129 B1* | 4/2008 | Barnicle | G08C 17/02 | 701/1 |
| 7,401,162 B2* | 7/2008 | Baker | H04L 69/18 | 709/250 |
| 7,479,714 B1* | 1/2009 | Rogers | H02J 3/14 | 307/38 |
| 7,573,845 B2* | 8/2009 | Harnisch | H04W 76/14 | 370/338 |
| 7,814,354 B2* | 10/2010 | Tran | H04L 12/12 | 713/323 |
| 7,821,930 B2* | 10/2010 | Massa | H04L 41/0654 | 370/400 |
| 7,864,687 B2* | 1/2011 | Qian | H04L 69/40 | 370/242 |
| 7,965,696 B2* | 6/2011 | Takayanagi | H04L 12/1868 | 370/312 |
| 8,014,378 B1* | 9/2011 | Yoon | H04W 4/00 | 370/324 |
| 8,065,048 B2* | 11/2011 | Bertosa | G07C 5/0808 | 701/32.7 |
| 8,175,099 B2* | 5/2012 | Hodges | G06F 13/4095 | 455/343.1 |
| 8,504,123 B1* | 8/2013 | Choi | H04W 52/0229 | 455/574 |
| 8,566,630 B2* | 10/2013 | Westerfield | G06F 11/006 | 713/340 |
| 8,694,829 B2* | 4/2014 | Tanaka | H04L 41/0654 | 714/26 |
| 9,544,754 B1* | 1/2017 | Lambert | H04W 8/005 | |
| 9,639,553 B2* | 5/2017 | Hall | H04L 47/2466 | |
| 9,712,688 B2* | 7/2017 | Pawlowski | H04N 1/00315 | |
| 9,734,119 B1* | 8/2017 | Chetverikov | G06F 13/4282 | |
| 10,085,161 B1* | 9/2018 | Oroskar | H04W 24/04 | |
| 10,118,421 B2* | 11/2018 | Teets | G03G 15/6502 | |
| 10,263,869 B1* | 4/2019 | Dzierwinski | H04L 43/50 | |
| 10,306,490 B2* | 5/2019 | Ratakonda | H04L 43/18 | |
| 2002/0091815 A1* | 7/2002 | Anderson | G06Q 10/06 | 707/999.107 |
| 2002/0105972 A1* | 8/2002 | Richter | H04L 67/1097 | 370/386 |
| 2002/0107971 A1* | 8/2002 | Bailey | H04L 9/40 | 709/230 |
| 2002/0194547 A1* | 12/2002 | Christensen | H04L 12/423 | 714/E11.026 |
| 2003/0167238 A1* | 9/2003 | Zeif | G06Q 10/0639 | 705/400 |
| 2003/0236837 A1* | 12/2003 | Johnson | H04L 67/1001 | 709/205 |
| 2005/0188260 A1* | 8/2005 | First | G06F 11/0748 | 714/25 |
| 2006/0146826 A1* | 7/2006 | Namihira | H04L 69/167 | 370/252 |
| 2006/0168467 A1* | 7/2006 | Couturier | H04L 43/50 | 714/4.2 |
| 2007/0011326 A1* | 1/2007 | Ohara | H04L 61/251 | 709/225 |
| 2007/0076625 A1* | 4/2007 | Tahara | H04L 69/166 | 370/428 |
| 2008/0013475 A1* | 1/2008 | Bandou | G05B 9/02 | 370/324 |
| 2008/0070569 A1* | 3/2008 | Shelley | H04L 67/04 | 455/426.2 |
| 2008/0170569 A1* | 7/2008 | Garg | H04L 12/1895 | 370/390 |
| 2009/0016720 A1* | 1/2009 | Lu | H04B 10/0793 | 398/63 |
| 2009/0024757 A1* | 1/2009 | Proctor | H04L 69/18 | 709/232 |
| 2009/0046723 A1* | 2/2009 | Rahman | H04L 41/0695 | 370/395.31 |
| 2009/0112398 A1* | 4/2009 | Wempen | G07C 5/0808 | 701/33.4 |
| 2009/0170461 A1* | 7/2009 | Kwon | H04B 7/0814 | 455/277.1 |
| 2010/0070661 A1* | 3/2010 | Cherry | H04L 69/10 | 710/19 |
| 2010/0080219 A1* | 4/2010 | Watanabe | H04N 1/33376 | 370/389 |
| 2010/0125749 A1* | 5/2010 | Tanaka | G06F 11/0742 | 714/45 |
| 2010/0169717 A1* | 7/2010 | Sonoda | H04L 12/4625 | 714/48 |
| 2010/0191992 A1* | 7/2010 | Shen | G06F 1/3215 | 713/320 |
| 2010/0305723 A1* | 12/2010 | Koyama | H04L 12/40039 | 700/90 |
| 2011/0084815 A1* | 4/2011 | Fitzek | H04W 52/0229 | 340/10.33 |
| 2011/0164595 A1* | 7/2011 | So | H04W 12/06 | 370/338 |
| 2011/0172842 A1* | 7/2011 | Makhota | G05B 9/02 | 700/286 |
| 2011/0302350 A1* | 12/2011 | Hsu | G06F 13/385 | 710/315 |
| 2011/0320015 A1* | 12/2011 | Yun | H04L 67/125 | 700/19 |
| 2012/0017105 A1* | 1/2012 | Thyni | H04L 12/40039 | 713/323 |
| 2012/0062356 A1* | 3/2012 | Mann | H01Q 1/246 | 340/3.5 |
| 2012/0079302 A1* | 3/2012 | Ise | G06F 1/324 | 713/323 |
| 2013/0013966 A1* | 1/2013 | Nakamoto | G06F 11/0793 | 714/54 |
| 2014/0101747 A1* | 4/2014 | Lu | H04W 12/06 | 726/9 |
| 2014/0115210 A1* | 4/2014 | Chirca | G06F 13/1689 | 710/110 |
| 2014/0275861 A1* | 9/2014 | Kroh | A61B 5/03 | 600/302 |
| 2015/0067434 A1* | 3/2015 | Kamijyo | H04L 1/1883 | 714/748 |
| 2015/0171642 A1* | 6/2015 | Kato | H02J 7/0016 | 320/107 |
| 2015/0200825 A1* | 7/2015 | Jang | H04L 67/12 | 370/216 |
| 2015/0254909 A1* | 9/2015 | Harata | G05B 23/0216 | 701/31.5 |
| 2016/0127308 A1* | 5/2016 | Yu | H04L 67/10 | 709/219 |
| 2016/0171791 A1* | 6/2016 | Cervantes | G07C 5/0808 | 701/31.5 |
| 2016/0357626 A1* | 12/2016 | Kim | G06F 11/0793 | |
| 2017/0017587 A1* | 1/2017 | West | G06F 13/4068 | |
| 2017/0136992 A1* | 5/2017 | Hamada | B60R 25/245 | |
| 2017/0180486 A1* | 6/2017 | Mehta | H04L 43/0852 | |
| 2017/0214567 A1* | 7/2017 | Salkintzis | H04W 52/0206 | |
| 2017/0318184 A1* | 11/2017 | Suzuki | H04N 1/32117 | |
| 2017/0332327 A1* | 11/2017 | Fang | H04W 52/0229 | |
| 2018/0047013 A1* | 2/2018 | Hayek | H04M 1/72412 | |
| 2018/0109982 A1* | 4/2018 | Zheng | H04W 48/16 | |
| 2018/0179021 A1* | 6/2018 | Uchida | B66B 5/0031 | |
| 2018/0213475 A1* | 7/2018 | Zhang | H04W 52/0235 | |
| 2018/0242249 A1* | 8/2018 | Yang | H04W 52/0216 | |

(56) References Cited

U.S. PATENT DOCUMENTS

| | | | | |
|---|---|---|---|---|
| 2018/0309590 | A1* | 10/2018 | Beckmann | H04L 12/40039 |
| 2019/0097428 | A1* | 3/2019 | Goi | B64D 31/14 |
| 2019/0171187 | A1* | 6/2019 | Cella | G06N 20/00 |
| 2019/0182698 | A1* | 6/2019 | Park | H04W 76/15 |
| 2021/0362194 | A1* | 11/2021 | Lundahl | B07C 3/08 |
| 2022/0022009 | A1* | 1/2022 | Toillon | H04W 24/04 |
| 2022/0046677 | A1* | 2/2022 | Talarico | H04W 72/14 |
| 2022/0078879 | A1* | 3/2022 | Nimbalker | H04W 52/0235 |

FOREIGN PATENT DOCUMENTS

| | | |
|---|---|---|
| JP | 2006-277733 | 10/2006 |
| JP | 2010-064158 | 3/2010 |
| JP | 6481248 | 3/2019 |

* cited by examiner

FIG. 2

| PROTOCOL | SETTING AND PARAMETER | ROBUSTNESS AND SENSITIVITY |
|---|---|---|
| PROTOCOL 1: ADDRESS CONFIRMATION | NODE ADDRESS, IP ADDRESS, AND HOSTNAME | NOT DEPENDENT ON COMMUNICATION TIMING. TIMEOUT TIME IS ONE TO SEVERAL TENS OF SECONDS. IT SUFFICES IF RESPONSE FUNCTION FOR EXISTENCE CONFIRMATION LEVEL BE MOVED. |
| PROTOCOL 2: MESSAGE COMMUNICATION | IN ADDITION TO ABOVE, PORT NUMBER AND COMMAND | NOT DEPENDENT ON COMMUNICATION TIMING. TIMEOUT TIME IS ONE TO SEVERAL TENS OF SECONDS. IT SUFFICES IF RESPONSE FUNCTION FOR DATA LEVEL BE MOVED. |
| PROTOCOL 3: CONNECTION | IN ADDITION TO ABOVE, CONNECTION PARAMETER TO PREDETERMINED COMMUNICATION ACCESS POINT OF PROTOCOL | PROTOCOL CONSTRAINT IS IMPOSED ON COMMUNICATION TIMING. PROTOCOL PROCESSING PART MUST BE MOVED. |
| PROTOCOL 4: I/O COMMUNICATION | IN ADDITION TO ABOVE, PARAMETERS SUCH AS CONNECTION PARAMETER TO PREDETERMINED INPUT/OUTPUT LOGIC MODULE OF PROTOCOL AND COMMUNICATION PERIOD | PROTOCOL CONSTRAINT IS IMPOSED ON COMMUNICATION TIMING. IT IS NECESSARY TO TRANSMIT AND RECEIVE DATA AT COMMUNICATION PERIOD CORRESPONDING TO CONTROL CYCLE. TIMEOUT TIME IS SEVERAL TO 100 MILLISECONDS. REAL-TIME COMMUNICATION PROCESSING PART MUST BE MOVED. TIMEOUT IN COMMUNICATION OCCURS DUE TO NOISE. |
| PROTOCOL 5: COMMUNICATION DEDICATED TO MACHINE TOOL | IN ADDITION TO ABOVE, PARAMETERS SUCH AS DEVICE INFORMATION AND DEVICE VERSION, USED FOR CONFIRMATION OF CONNECTION TO MACHINE TOOL AND THE LIKE | FUNCTION NECESSARY FOR APPLICATION OF MACHINE TOOL IS REALIZED BY COMMUNICATION. TO ENSURE NORMAL OPERATION, IT IS NECESSARY TO CONFIRM CONFIGURATIONS OF DEVICES AND SUPPORTED VERSION. |

FIG. 3A

| DIAGNOSIS ROUTINE | DETAILS OF DIAGNOSIS | DIAGNOSIS FUNCTION |
|---|---|---|
| PROTOCOL 1: ADDRESS CONFIRMATION | ·WHETHER OR NOT NODE IS PRESENT BY SEARCH FOR NETWORK ADDRESS | ·PRODUCE LIST OF NETWORK ADDRESSES. |
| PROTOCOL 2: MESSAGE COMMUNICATION | ·WHETHER OR NOT REQUESTED DATA TO REQUEST FOR TRANSMISSION OF NUMERICAL VALUE, CHARACTER STRING, OR FILE CAN BE RECEIVED<br>·RESPONSE WITHIN CERTAIN TIME | ·READ VERSION.<br>·READ SETTING FILE (UTILIZED FOR DETECTION OF SETTING ERROR IN PROTOCOLS 3 TO 5).<br>·DISPLAY DEVICE NAME AND THE LIKE IN LIST OF NETWORK ADDRESSES. |
| PROTOCOL 3: CONNECTION | ·RESPONSE FROM PARTNER DEVICE FOR REQUEST FOR START OF COMMUNICATION WITH COMMUNICATION ACCESS POINT (PROFILE MATCH)<br>·RESPONSE WITHIN CERTAIN TIME | ·ACQUIRE PREDETERMINED ERROR CODE OF PROTOCOL AND DISPLAY IT IN HUMAN-READABLE FORM. DISPLAY REASON FOR CONNECTION FAILURE AND METHOD OF DEALING THEREWITH.<br>·TO CONFIRM INPUT ERROR OF COMMUNICATION PROFILE, RETRY CONNECTION BY CHANGE OF COMMUNICATION PROFILE. DISPLAY SPECIFIC PART OF SETTING ERROR.<br>·WHETHER OR NOT CONNECTION IS ESTABLISHED IS DISPLAYED IN LIST OF NETWORK ADDRESSES. |

FIG. 3B

| DIAGNOSIS ROUTINE | DETAILS OF DIAGNOSIS | DIAGNOSIS FUNCTION |
|---|---|---|
| PROTOCOL 4: I/O COMMUNICATION | • RESPONSE OF PARTNER DEVICE FOR REQUEST FOR START OF COMMUNICATION WITH TRANSMISSION/RECEPTION DATA LOGIC MODULE BELONGING TO COMMUNICATION ACCESS POINT (PROFILE MATCH)<br>• RESPONSE WITHIN CERTAIN TIME<br>• EVALUATION OF COMMUNICATION PERIOD, COMMUNICATION DELAY, AND VARIATIONS THEREIN | • ACQUIRE PREDETERMINED ERROR CODE OF PROTOCOL AND DISPLAY IT IN HUMAN-READABLE FORM. DISPLAY REASON FOR CONNECTION FAILURE AND METHOD OF DEALING THEREWITH.<br>• TO CONFIRM INPUT ERROR OF COMMUNICATION PROFILE, RETRY CONNECTION BY CHANGE OF COMMUNICATION PROFILE. DISPLAY SPECIFIC PART OF SETTING ERROR.<br>• EVALUATE STABILITY RELATING TO COMMUNICATION PARAMETER (COMMUNICATION PERIOD).<br>• DETECT ABNORMALITY IN COMMUNICATION QUALITY (COMPARISON WITH PAST LOG).<br>• DETERMINE PRESENCE OR POSSIBILITY OF NOISE.<br>• WHEN COMMUNICATION PERIOD SETTING IS EXCESSIVELY SMALL, RECOMMENDED VALUE IS ESTIMATED.<br>• DISPLAY, IN LIST OF NETWORK ADDRESSES, INDICATOR FOR COMMUNICATION STATE IN DIFFERENT COLOR OR WITH ICON. |
| PROTOCOL 5: COMMUNICATION DEDICATED TO MACHINE TOOL | • CONFIRM WHETHER TYPES OF MACHINE TOOL IN SETTING AND IN ACTUALITY AGREE WITH EACH OTHER<br>• CONFIRM WHETHER VERSIONS OF APPLICATION IN CONTROLLER AND IN MACHINE TOOL AGREE WITH EACH OTHER (WHEN THEY ARE DIFFERENT, THEY CANNOT BE USED BECAUSE INTERFACE OR DATA STRUCTURE IS DIFFERENT) | • DISPLAY ERROR CODE FROM MACHINE TOOL IN HUMAN-READABLE FORM. |

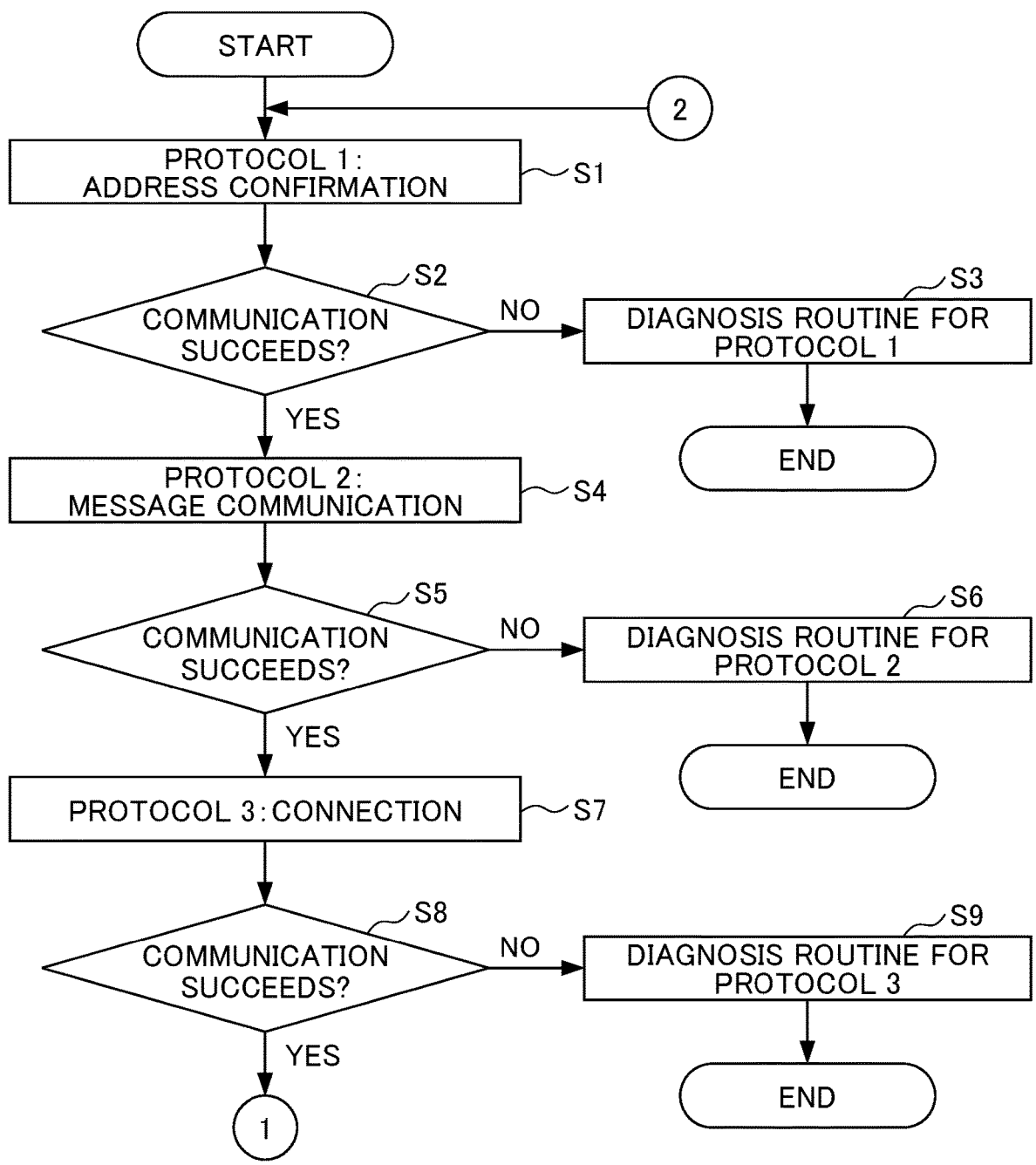

CONTROLLER, DIAGNOSIS METHOD, AND DIAGNOSIS PROGRAM

This application is based on and claims the benefit of priority from Japanese Patent Application No. 2019-128347, filed on 10 Jul. 2019, the content of which is incorporated herein by reference.

BACKGROUND OF THE INVENTION

Field of the Invention

The present invention relates to a controller, a method, and a program that diagnoses communication conditions.

Related Art

Conventionally, a machining system is known in which a machine tool and an auxiliary device for assisting the machine tool establish a machining cell and in which they cooperate to perform machining (see, for example, Patent Document 1). In such a machining system, for example, a controller for a machining center and a controller for a robot are connected so as to be able to communicate with each other, various types of information are directly communicated between the controllers, and thus a cooperation operation between the machining center and the robot is realized.

Patent Document 1: Japanese Unexamined Patent Application, Publication No. 2010-64158

SUMMARY OF THE INVENTION

However, since there is a tendency for a communication protocol between the controllers to be complicated and the number of communication setting parameters and amount of device information to be increased, when the establishment of communication fails or a communication error occurs, it is difficult to identify the cause thereof. Hence, it is desired to be able to easily identify a cause of a communication abnormality.

A controller according to an aspect of the present disclosure is a controller of an industrial machine that communicates with an external device through a network and includes: a plurality of communication units which respectively correspond to a plurality of communication protocols; and a diagnosis unit which starts up the communication units in a predetermined order and attempts communication using the communication protocols corresponding to each communication unit that is started up so as to diagnose the conditions of the communication step by step.

In a diagnosis method according to an aspect of the present disclosure, a controller of an industrial machine that communicates with an external device through a network starts up, in a predetermined order, a plurality of communication units which respectively correspond to a plurality of communication protocols and attempts communication using the communication protocols corresponding to the communication units which are started up so as to diagnose the conditions of communication step by step.

A diagnosis program according to an aspect of the present disclosure is a diagnosis program for making a computer function as the controller.

According to the present invention, it is possible to easily identify a cause of a communication abnormality in a controller of an industrial machine.

BRIEF DESCRIPTION OF THE DRAWINGS

FIG. 2 is a diagram illustrating a plurality of communication protocols used when the controller in the embodiment communicates with a controller of a machine tool that serves as an external device;

FIG. 3A is a first diagram illustrating the details of diagnosis of communication conditions in each of the communication protocols in the embodiment;

FIG. 3B is a second diagram illustrating the details of diagnosis of the communication conditions in each of the communication protocols in the embodiment;

FIG. 4A is a first flowchart showing the flow of diagnosis processing on the communication conditions in the embodiment.

DETAILED DESCRIPTION OF THE INVENTION

An example of the embodiment of the present invention will be described below. A controller 1 in the present embodiment is an information processing device for controlling an industrial machine such as a machine tool or a robot and is connected to an external device through a network so as to communicate therewith, with the result that a manufacturing system is configured. The external device is an industrial machine, an information device, or the like, and examples thereof include a production management system, a line controller, a robot controller, a controller of a machine tool, and a remote I/O device. The controller 1 may be incorporated into the industrial machine or may be provided in a separate housing and connected so as to be able to communicate therewith.

Figure 1:
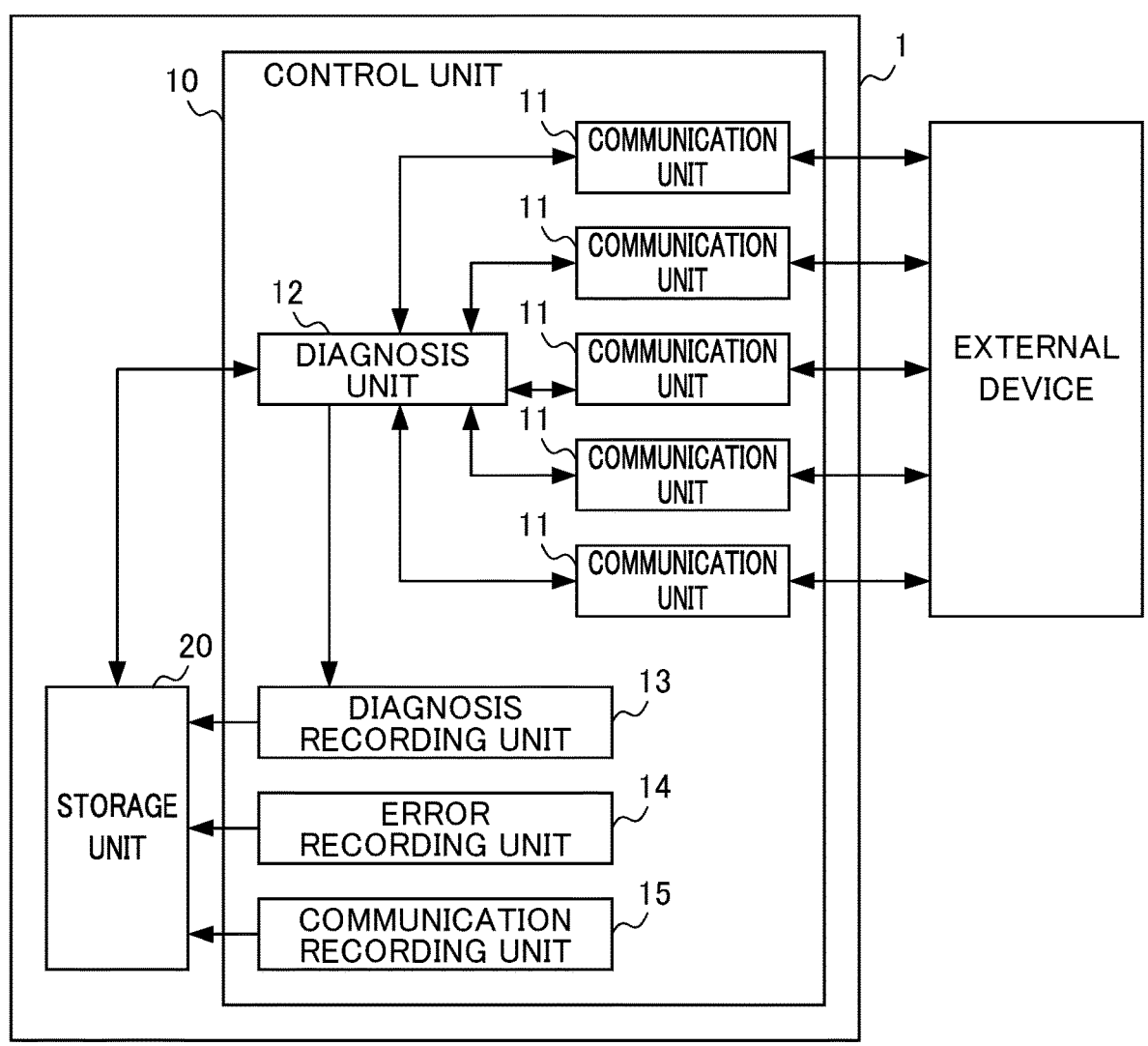
FIG. 1 is a diagram showing the functional configuration of a controller in an embodiment.

FIG. 1 is a diagram showing the functional configuration of the controller 1 in the present embodiment. The controller 1 includes a control unit 10 which is formed with a processor such as a CPU and a storage unit 20 in which various types of software and data are stored, and further includes various types of input/output devices and communication interfaces.

The control unit 10 includes a plurality of communication units 11, a diagnosis unit 12 which diagnoses the conditions of communication using the communication units 11, a diagnosis recording unit 13, an error recording unit 14, and a communication recording unit 15.

The plurality of communication units 11 are provided so as to respectively correspond to a plurality of communication protocols which are supported by communication paths with the external device. The control unit 10 uses any one of these communication units 11 so as to communicate, by use of the corresponding communication protocol, with the external device through the network.

In the present embodiment, for example, communication protocols as described below are assumed. In Ethernet, for example, TCP/IP, UDP/IP, PING, ARP, or the like is used. In serial communication, for example, RS-232C, RS-485, or the like is used. In Fieldbus, DeviceNet, Profibus, CC-Link, or the like is used. In industrial Ethernet, EtherNet/IP, ProfiNet, CC-Link IE, or the like is used. In object communication, CIP, OPC/UA, or the like is used. In communication dedicated to a machine tool, a communication protocol with the unique specifications of a machine tool maker is used.

The diagnosis unit 12 starts up the communication units 11 in a predetermined order and attempts communication using the communication protocols corresponding to each communication unit 11 which is started up so as to diagnose the conditions of communication step by step. Here, the diagnosis unit 12 sequentially executes diagnosis processing corresponding to the individual communication protocols.

The diagnosis unit 12 can change various types of communication parameters in the communication protocol, and when the diagnosis unit 12 has unsuccessful communication using any one of the communication protocols, the diagnosis unit 12 changes the communication parameters so as to attempt communication again. For example, the diagnosis unit 12 changes a communication profile so as to attempt communication again. When the diagnosis unit 12 transmits and receives a control signal at a predetermined communication period, if the communication unit 11 cannot obtain a reception signal and has unsuccessful communication due to a timeout, the diagnosis unit 12 extends a time until the timeout with a predetermined threshold value set to an upper limit so as to attempt communication again.

FIG. 2 is a diagram illustrating a plurality of communication protocols used when the controller 1 in the present embodiment communicates with a controller of a machine tool which serves as the external device. The controller 1 supports, for example, five types of communication protocols, which are address confirmation, message communication, connection, I/O communication, and communication dedicated to a machine tool. The external device also supports these communication protocols and is connected according to a request from the controller 1 so as to communicate therewith.

In the protocol 1 of address confirmation, a node address, an IP address, a hostname, and the like are set as communication parameters. In the protocol 1, a response for existence confirmation is requested, and there is no limitation to communication timing, but a timeout occurs in the reception of a response signal in about one to several tens of seconds.

In the protocol 2 of message communication, in addition to the case of the protocol 1, a port number, a command, and the like are set as communication parameters. In the protocol 2, a response for data level is requested, and there is no limitation to communication timing, but a timeout occurs in the reception of the response signal in about one to several tens of seconds.

In the protocol 3 of connection, in addition to the case of the protocol 2, a connection parameter to a predetermined communication access point is set. In the protocol 3, a previously defined processing procedure is requested, and a predetermined constraint is imposed on communication timing and the like.

In the protocol 4 of I/O communication, in addition to the case of the protocol 3, a connection parameter to a predetermined input/output logic module and parameters for the communication period and the like are set. In the protocol 4, communication processing on the control signal is requested in real time, and a predetermined constraint is imposed on communication timing and the like. Specifically, it is necessary to transmit and receive data at the communication period corresponding to a control cycle, and a timeout occurs due to, for example, noise in a short period of about several to 100 milliseconds.

In the protocol 5 of communication dedicated to a machine tool, in addition to the case of the protocol 4, for example, in order to confirm a connection to the machine tool, device information, a device version, and the like are set as communication parameters. In the protocol 5, functions necessary for the application of the machine tool are realized by communication. In order to ensure normal operation, it is necessary to confirm the configurations of the devices and the supported version.

In this example, the communication units 11 of the protocols 1 and 2 may be started up at the time of diagnosis and may be stopped during the normal operation of the controller 1. Since the protocol 4 can be used in place of a heartbeat function which is realized with the protocol 3 during the normal operation, the communication unit 11 of the protocol 3 may likewise be stopped. On the other hand, since the protocols 4 and 5 are needed in a cooperative operation with the external device, the corresponding communication units 11 are constantly operated.

In the protocols 1 to 5, communication parameters, constraints on the communication and the like are increased in this order, and the complexity thereof is increased. Hence, while the protocol 1 or 2 can be said to be a robust communication protocol, in the protocol 3 and the subsequent protocols, a parameter setting error or a communication error easily occurs.

The diagnosis unit 12 sequentially starts up the communication units 11 corresponding to the protocols 1 to 5 when the controller 1 is started up, and when communication succeeds in each protocol, the diagnosis unit 12 proceeds to the subsequent protocol step by step. Here, when an error occurs in any one of the communication protocols, the diagnosis unit 12 executes a diagnosis routine for communication conditions that corresponds to the stage and thereby collects various types of information for identifying a cause thereof so as to output them.

FIGS. 3A and 3B are diagrams illustrating the details of the diagnosis of communication conditions in each of the communication protocols in the present embodiment. Individual diagnosis routines are respectively prepared for the protocols 1 to 5, and the software of the external device includes a processing sequence corresponding to the diagnosis routines. The diagnosis unit 12 may not only use the communication protocol in which an error occurs but also use the diagnosis routine that has been diagnosed and which corresponds to the communication protocol in the previous stage so as to diagnose the communication conditions.

In the diagnosis routine for the protocol 1 of address confirmation, whether or not a node is present is diagnosed by a search for a network address with PING, ARP, or the like. Here, the diagnosis unit 12 produces a list of network addresses.

In the diagnosis routine for the protocol 2 of message communication, whether or not response data for a request for the transmission of a numerical value, a character string, a file, or the like can be received within a certain time is diagnosed. Here, the diagnosis unit 12 reads the version of the software which is operated in the external device, a setting file that is referenced in the protocols 3 to 5 in the subsequent stages, and the like. The diagnosis unit 12 adds, to the list of network addresses, the name of the external device and the like that are read.

In the diagnosis routine for the protocol 3 of connection, whether or not the communication profile is matched and a connection destination is correct is diagnosed based on a response from the external device within a certain time to a request for the start of communication with the communication access point. Here, the diagnosis unit 12 acquires an error code which is defined in the communication protocol and outputs the details of the error. The diagnosis unit 12 may present the reason for a connection failure, a method of dealing therewith, and the like, which are previously associated with the error code. Furthermore, in order to confirm an error in the input of the communication profile, the diagnosis unit 12 changes the communication profile so as to attempt connection again. Consequently, when the diagnosis unit 12 succeeds in the connection, the diagnosis unit 12 may present the specific part of a setting error. The diagnosis unit 12 adds, to the list of network addresses, whether or not the connection is established.

In the diagnosis routine for the protocol 4 of I/O communication, whether or not the communication profile is matched and a connection destination is correct is diagnosed based on a response from the external device within a certain time to a request for the start of communication with a transmission/reception data logic module which belongs to the communication access point. The communication period of the control signal, a communication delay, and variations therein are evaluated. Here, as in the case of the protocol 3, the diagnosis unit 12 acquires an error code which is defined in the communication protocol, and outputs the details of the error. The diagnosis unit 12 may present the reason for a connection failure, a method of dealing therewith, and the like which are previously associated with the error code. Furthermore, in order to confirm an error in the input of the communication profile, the diagnosis unit 12 changes the communication profile so as to attempt communication again. Consequently, when the diagnosis unit 12 succeeds in communication, the diagnosis unit 12 may present the specific part of a setting error.

The diagnosis unit 12 evaluates stability relating to the communication period which is the communication parameter, for example, the rate of occurrence of an error, compares it with past log information, and thereby determines the possibility that an abnormality in communication quality, that is, noise, is present. Furthermore, the diagnosis unit 12 may repeat the adjustment of the communication period and a timeout time so as to determine the recommended values of the communication period and a delay margin in which the rate of occurrence of an error is lowered. Since the communication period and the timeout time affect a machining time, a production amount, and the like, they are preferably set to be low. Since an upper limit is provided for the protocol 5 of communication dedicated to a machine tool in the subsequent stage, the communication period and the timeout time are set to large values within a range up to the upper limit in a step-by-step manner. The diagnosis unit 12 may add to the list of network addresses an indicator for the evaluated communication state, and may display it, for example, in a different color or with an icon.

In the diagnosis routine for the protocol 5 of communication dedicated to a machine tool, whether or not the types of machine tool serving as the external device in the setting and in actuality agree with each other is confirmed. Since an interface, a data structure, or the like differs depending on the version of the application, whether or not the versions of the application in the controller 1 and in the machine tool agree with each other is confirmed. Here, the diagnosis unit 12 acquires the error code from the machine tool and outputs the details of the error.

These diagnosis routines are sequentially executed immediately after the controller 1 is started up, at regular intervals in the normal operation of the controller 1, and when an error occurs.

The diagnosis recording unit 13 records the result of the diagnosis by the diagnosis unit 12 in the storage unit 20 together with time information. The error recording unit 14 records, in the storage unit 20, together with the time information, the information of the communication protocol used when the diagnosis unit 12 has unsuccessful communication with the external device. The communication recording unit 15 records, when the diagnosis unit 12 has successful communication with the external device, parameters set in the communication protocols in the storage unit 20 together with the time information.

Figure 4B:
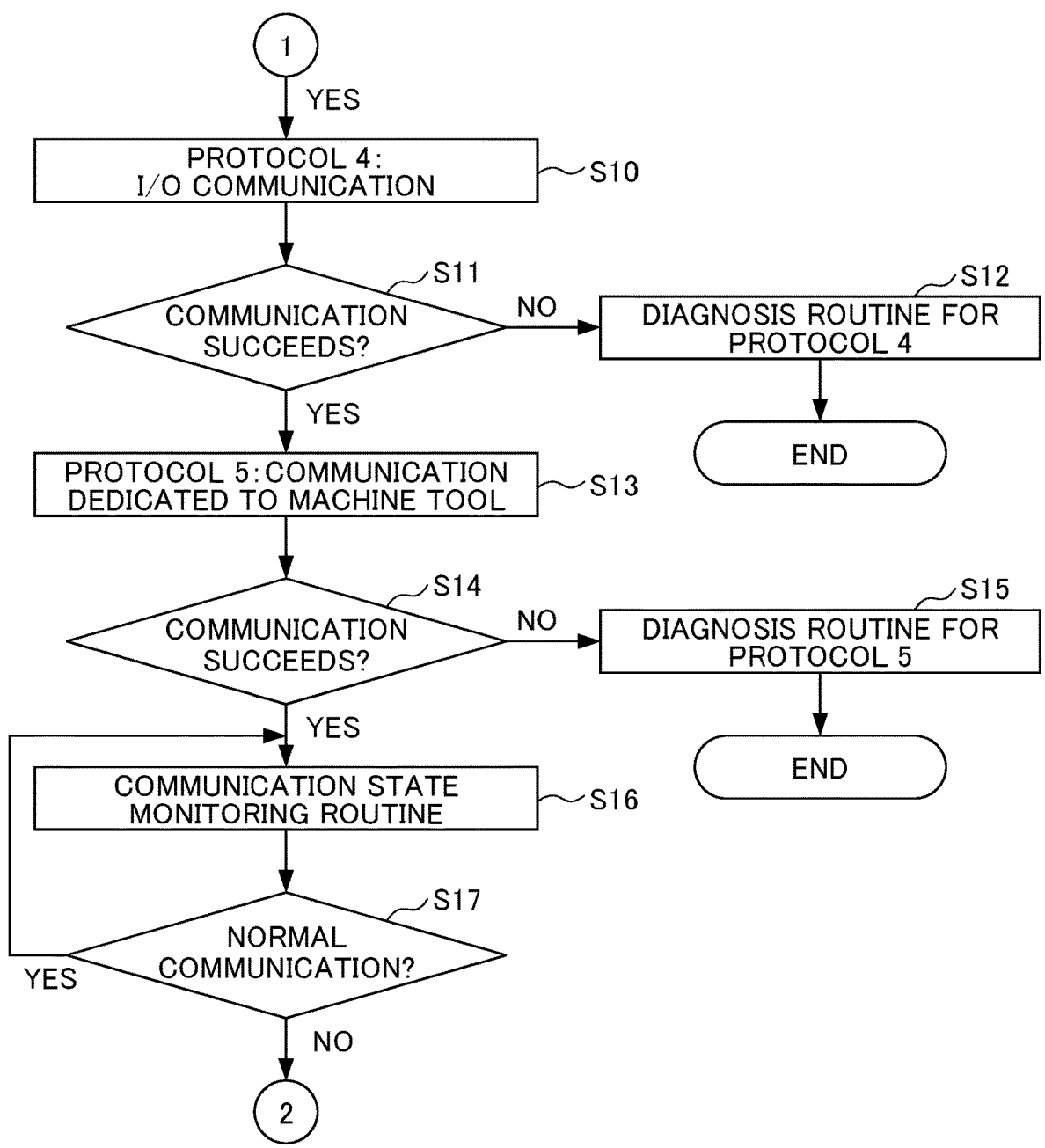
FIG. 4B is a second flowchart showing the flow of the diagnosis processing on the communication conditions in the embodiment.

FIGS. 4A and 4B are flowcharts showing the flow of the diagnosis processing on the communication conditions that is executed with the diagnosis unit 12 of the controller 1 in the present embodiment.

In step S1, the diagnosis unit 12 starts up the communication unit 11 corresponding to the protocol 1 so as to attempt the communication of the address confirmation with the external device. In step S2, the diagnosis unit 12 determines whether or not the communication using the protocol 1 succeeds. When the determination is yes, the processing is transferred to step S4, whereas when the determination is no, the processing is transferred to step S3. In step S3, the diagnosis unit 12 executes the diagnosis routine for the protocol 1 and completes the processing.

In step S4, the diagnosis unit 12 starts up the communication unit 11 corresponding to the protocol 2 so as to attempt the message communication with the external device. In step S5, the diagnosis unit 12 determines whether or not the communication using the protocol 2 succeeds. When the determination is yes, the processing is transferred to step S7, whereas when the determination is no, the processing is transferred to step S6. In step S6, the diagnosis unit 12 executes the diagnosis routine for the protocol 2 and completes the processing.

In step S7, the diagnosis unit 12 starts up the communication unit 11 corresponding to the protocol 3 so as to attempt the communication of the connection with the external device. In step S8, the diagnosis unit 12 determines whether or not the communication using the protocol 3 succeeds. When the determination is yes, the processing is transferred to step S10, whereas when the determination is no, the processing is transferred to step S9. In step S9, the diagnosis unit 12 executes the diagnosis routine for the protocol 3 and completes the processing.

In step S10, the diagnosis unit 12 starts up the communication unit 11 corresponding to the protocol 4 so as to attempt the I/O communication with the external device. In step S11, the diagnosis unit 12 determines whether or not the communication using the protocol 4 succeeds. When the determination is yes, the processing is transferred to step S13, whereas when the determination is no, the processing is transferred to step S12. In step S12, the diagnosis unit 12 executes the diagnosis routine for the protocol 4 and completes the processing.

In step S13, the diagnosis unit 12 starts up the communication unit 11 corresponding to the protocol 5 so as to attempt the communication dedicated to a machine tool with the external device. In step S14, the diagnosis unit 12 determines whether or not the communication using the protocol 5 succeeds. When the determination is yes, the processing is transferred to step S16, whereas when the determination is no, the processing is transferred to step S15. In step S15, the diagnosis unit 12 executes the diagnosis routine for the protocol 5 and completes the processing.

In step S16, the diagnosis unit 12 periodically executes a communication state monitoring routine with predetermined timing. In step S17, the diagnosis unit 12 determines whether or not the communication state is normal. When the determination is yes, the processing is returned to step S16, and the communication state monitoring routine is continued. On the other hand, when the determination is no, the processing is returned to step S1, and the restarting of communication is attempted from the protocol 1.

When in step S17, it is determined that the communication state is not normal, the step to which the processing is transferred does not need to be fixed to step S1. For example, the diagnosis unit 12 may determine, according to the error that occurs, a return position, that is, from which one of the communication protocols the processing is to be started. Although when communication fails in any one of the communication protocols, the diagnosis processing is completed immediately after the diagnosis routine is executed, there is no limitation to this configuration. For example, when a predetermined number of attempts are performed while the parameters are being changed but communication fails, the processing may be completed.

Although the controller of the machine tool with which the controller 1 communicates and which serves as the external device has been illustrated, as described above, the present embodiment can be applied to systems that are connected to various devices so as to communicate therewith, and a diagnosis program corresponding to the external device serving as the connection destination is provided. For example, the protocols 1 to 5 described above are changed as follows according to the external device.

When the external device is a production management system, the protocol 3 of connection and the protocol 4 of I/O communication are not necessary, and the protocol 5 of communication dedicated to a production management system is provided. When the external device is a line controller, the protocol 5 of communication dedicated to a line controller is provided. When the communication target is only the I/O of the control signal, the protocol 5 is not necessary. When the external device is a robot controller, the protocol 5 of communication dedicated to a robot controller is provided. When the external device is a remote I/O device, the protocol 5 of communication dedicated to a remote I/O device is provided. When the communication target is only the I/O of the control signal, the protocol 5 is not necessary.

According to the present embodiment, it is possible to obtain, for example, the operational effects below.

(1) A controller 1 of an industrial machine which communicates with an external device through a network includes: a plurality of communication units 11 which respectively correspond to a plurality of communication protocols; and a diagnosis unit 12 which starts up the communication units 11 in a predetermined order and attempts communication using the communication protocols corresponding to the communication units 11 that are started up so as to diagnose the conditions of communication step by step.

In this way, in the controller 1, when a plurality of communication protocols can coexist, the communication protocols are shifted step by step from a simple and robust communication protocol which is technically simple and has a long timeout time to a communication protocol which is complicated and prone to communication errors, and in each of the stages, the conditions of communication are diagnosed. Hence, the controller 1 can easily identify the cause of a communication abnormality in a step-by-step manner. Consequently, a burden and time for a manual inspection and a recovery operation are reduced. Since it is possible to collect information with communication protocols that are normally operated, for example, when data communication succeeds but a failure occurs in the subsequent stage, the controller 1 acquires parameters for the external device by data communication so as to be able to efficiently inspect a cause thereof.

(2) In the controller 1 described in (1), when the diagnosis unit 12 has unsuccessful communication using any one of the communication protocols, the diagnosis unit 12 may change the communication parameter so as to attempt communication again.

In this way, the controller 1 changes the communication parameter so as to attempt communication again, and thereby can estimate an appropriate communication parameter. The controller 1 can also correct an error in the communication parameter so as to be able to automatically recover from a communication abnormality.

(3) In the controller 1 described in (2), when the diagnosis unit 12 cannot obtain a reception signal and has unsuccessful communication due to a timeout, the diagnosis unit 12 may extend a time until the timeout with a predetermined threshold value set to an upper limit so as to attempt communication again.

In this way, the controller 1 gradually extends the time until the timeout so as to be able to normally perform communication and set an appropriate time in which the efficiency of communication is high. The controller 1 sets an upper limit for the time capable of being set so as to be able to diagnose whether or not communication can be performed under realistic conditions such as a machining time.

(4) The controller 1 described in any one of (1) to (3) may include a diagnosis recording unit 13 which records the result of the diagnosis by the diagnosis unit 12 together with time information.

In this way, the controller 1 records the result of the diagnosis of a communication abnormality as a log so as to be able to provide information for an inspection to a user and to reduce a burden and time on the identification of a cause thereof and on recovery.

(5) The controller 1 described in any one of (1) to (4) may include an error recording unit 14 which records, together with the time information, the information of the communication protocol used when the diagnosis unit 12 has unsuccessful communication with the external device.

In this way, the controller 1 records, as a log, the information of the communication protocol used when the diagnosis unit 12 has unsuccessful communication so as to be able to provide the rate of occurrence of an error in each of the communication protocols and the like, and thus it can be made useful for diagnosis when an error occurs in the future.

(6) The controller 1 described in any one of (1) to (5) may include a communication recording unit 15 which records, when the diagnosis unit 12 has successful communication with the external device, parameters set in the communication protocols together with the time information.

In this way, the controller 1 records, as a log, the communication parameter used when the diagnosis unit 12 has successful communication so as to be able to provide parameters at which normal communication can be performed and the change history thereof, and thus it can be made useful for diagnosis when an error occurs in the future.

Although an embodiment of the present invention has been described above, the present invention is not limited to the embodiment described above. The effects described in the present embodiment are simply a list of the most preferred effects produced from the present invention, and the effects in the present invention are not limited to those in the present embodiment.

A diagnosis method performed with the controller 1 is realized by software. When the diagnosis method is realized by software, the programs of the software are installed into a computer. These programs may be recorded in removable media so as to be distributed to users or may be distributed by being downloaded into the computers of users through a network.

EXPLANATION OF REFERENCE NUMERALS 1 controller
10 control unit
11 communication unit
12 diagnosis unit
13 diagnosis recording unit
14 error recording unit
15 communication recording unit
20 storage unit

What is claimed is:

1. A controller of an industrial machine which communicates with an external device through a network, the controller configured to execute a program and operate as:
 a plurality of communication units which respectively correspond to a plurality of communication protocols; and
 a diagnosis unit configured to start up the communication units in stages in an increasing order of complexity of the corresponding communication protocols, and attempt communication using the communication protocols corresponding to each communication unit that is started up so as to diagnose conditions of communication at each stage and identify the cause of a communication abnormality.

2. The controller according to claim 1, wherein when the diagnosis unit has unsuccessful communication using any one of the communication protocols, the diagnosis unit changes a communication parameter so as to attempt communication again.

3. The controller according to claim 2, wherein when the diagnosis unit cannot obtain a reception signal and has unsuccessful communication due to a timeout, the diagnosis unit extends a time until the timeout with a predetermined threshold value set to an upper limit so as to attempt communication again.

4. The controller according to claim 1, wherein the controller is further configured to execute the program and operate as:
 a diagnosis recording unit configured to record a result of the diagnosis by the diagnosis unit together with time information.

5. The controller according to claim 1, wherein the controller is further configured to execute the program and operate as:
 an error recording unit configured to record, together with time information, information of the communication protocol used when the diagnosis unit has unsuccessful communication with the external device.

6. The controller according to claim 1, wherein the controller is further configured to execute the program and operate as:
 a communication recording unit configured to record, when the diagnosis unit has successful communication with the external device, parameters set in the communication protocols together with time information.

7. A diagnosis method performed by a controller of an industrial machine comprising:
 starting up, in stages in an increasing order of complexity of corresponding communication protocols, a plurality of communication units, which communicate with an external device through a network, the plurality of communication units respectively corresponding to the plurality of communication protocols; and
 attempting communication using the communication protocols corresponding to each communication unit that is started up so as to diagnose conditions of communication at each stage and identify the cause of a communication abnormality.

8. A non-transitory computer readable medium having a diagnosis program recorded thereon and configured to make a computer function as the controller according to claim 1.

* * * * *